Sept. 22, 1959  J. L. EDELEN  2,904,877
METHOD OF MANUFACTURE OF A NEEDLE VALVE AND SEAT ASSEMBLY
Filed Oct. 5, 1953  3 Sheets-Sheet 1

INVENTOR.
JAMES L. EDELEN
BY George R. Ericson
ATTORNEY

INVENTOR.
JAMES L. EDELEN

BY

ATTORNEY

INVENTOR.
JAMES L. EDELEN

United States Patent Office 2,904,877
Patented Sept. 22, 1959

2,904,877

METHOD OF MANUFACTURE OF A NEEDLE VALVE AND SEAT ASSEMBLY

James L. Edelen, Kirkwood, Mo., assignor, by mesne assignments, to ACF Industries, Incorporated, New York, N.Y., a corporation of New Jersey Application October 5, 1953, Serial No. 384,047

2 Claims. (Cl. 29—157.1)

This invention relates to a novel manufacturing process adapted to volume production of needle valves and seats, and to the products of this process. More specifically, this invention relates to a process of producing accurately matched valves and seats for carburetors without resort to expensive finishing operations, such as lapping of the seat and the needle, heretofore considered essential to the production of an assembly intended to be liquid tight.

Conventional carburetors are provided with a constant lever chamber having a float and needle valve assembly which is depended upon to control the mean fuel level. While normally, the valves for these assemblies are intended to be liquid tight when closed, leakage which does not exceed the consumption of the engine at idling speed is not considered serious. Unfortunately, however, considerable difficulty has been experienced with existing mass production methods in providing needle and seat combinations which are sufficiently accurately matched even to limit leakage to the extent mentioned. Moreover, the comparatively large ratio of defective valve parts produced under currently used methods makes it inevitable, even with normally rigid inspection, that a certain number of defective valves will find their way into finished carburetors, with resulting dissatisfaction on the part of the user.

The primary object of the present invention is to provide a novel method of producing accurately matched needle and seat combinations for use in carburetors.

Briefly, the method of the present invention contemplates forming a valve cage by ordinary automatic machining operations which leave an annular shoulder having a relatively sharp inner edge in which the valve seat is to be formed. The seat is then formed by an operation which includes extrusion of the material forming the edge of the shoulder by a swaging tool having a hardened end finished to a smooth, accurate, conical taper. The needle for cooperation with the thus formed seat is also formed by ordinary automatic methods which include machining one end of the needle to a conical taper which is complementary, except as to finish, with the previously described valve seat. The tapered end of the needle, which may show ordinary tool marks, is then coated, by plating or the like, with a comparatively soft metal, such as tin for example. It has been found that such a coating provides a comparatively smooth surface in contrast with the irregularities of the original tooled surface. The coated needle is then assembled with the valve cage and tapped lightly against the previously formed seat, thereby extruding the soft metal coating against the accurately formed seat and providing a mating fit which is substantially leak-proof.

A modification of the seat forming process above described comprises a double swaging operation wherein two swaging tools having different degrees of taper are employed to form the seat. In this modified process, the machined valve cage is swaged first with a tool having an included angle of taper greater than that of the needle and then with a tool having an included angle of taper less than that of the needle. Thus, the seat is formed entirely through the swaging operation and is such as to provide, substantially, annular line contact with the needle, as contrasted to the surface contact provided by the first mentioned process.

In order to convey a thorough understanding of the present invention, I have illustrated in the accompanying drawings, not only the steps of the novel processes, but also the theories which underlie the same. Thus, in the drawings.

Figure 1:
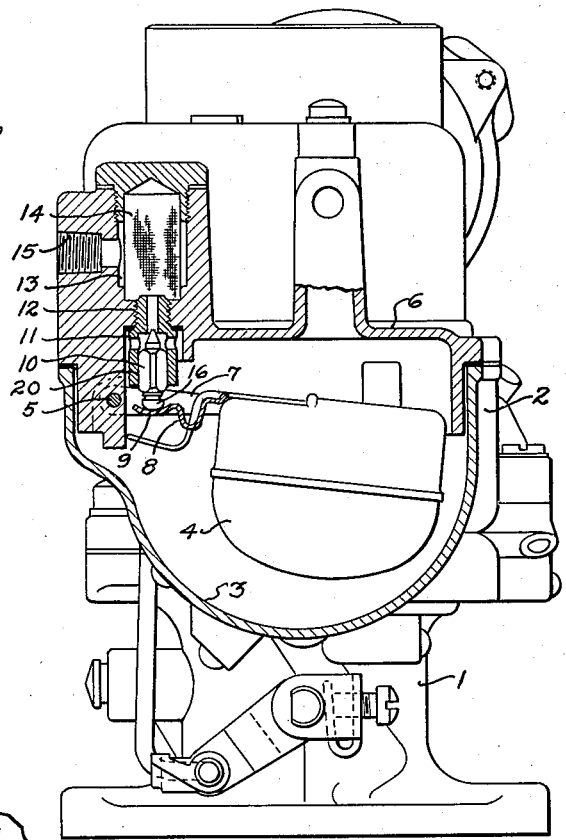
Fig. 1 is a general environmental view showing a carburetor in elevation, with parts broken away to disclose the subject matter of the present invention.

Referring to the drawings more particularly by means of reference numerals, Fig. 1 shows a carburetor of conventional design which comprises a throttle body 1 and a main body 2. A float bowl 3 is formed integral with main body 2 and contains the usual float 4 supported from a hinge 5 carried by the float bowl cover 6. Float 4 has an arm 7 which, in addition to being pivoted upon a hinge 5, has a lip 8 struck therefrom in a manner to define a concave depression 9.

A needle valve 10 of angular section, supported at its hemispherical lower end 16 by lip 8, is disposed for vertical axial movement in a cage 11, the latter being mounted in bowl cover 6 by means of an externally threaded nipple 12. The general arrangement is conventional in that the needle 10 and cage 11 form a needle valve assembly which is actuated by float 4 to admit fuel from a reservoir 13 into the float bowl 3 to maintain fuel therein at a substantially constant level. The curved abutting faces of lip 8 and the head of the needle valve assure centering of the valve, as will be described hereafter. A fine mesh screen 14 is interposed between the needle valve assembly and a fuel inlet 15 to prevent foreign matter from entering the valve assembly.

Figure 2:
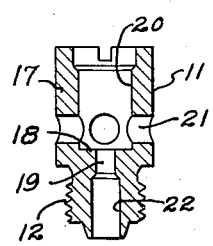
Fig. 2 is a view in vertical section showing a completely machined valve cage prior to forming a seat therein.

Directing attention now to the valve parts with which the present invention is primarily concerned, Fig. 2 depicts valve cage 11 shown inverted and shaped to final form except for the seat for needle valve 10. The guide portion 17 of the cage is axially counterbored so as to provide a shoulder 18 between a small diameter throat 19 and a larger diameter recess 20. Recess 20 is adapted to closely receive needle valve 10 and to serve as a guide therefor. A plurality of transversely extending outlet ports 21 in guide portion 17, provide for free passage of fuel from the inlet portion 22 of the cage through throat 19 and thence into the fuel chamber when the needle valve is off its seat.

Figure 3:
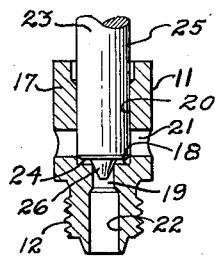
Fig. 3 is a view similar to Fig. 2, but showing in addition a portion of a swaging tool in position to form a seat.
Figure 4:
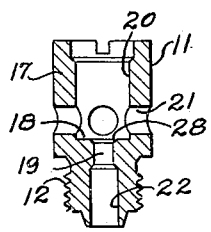
Fig. 4 is a view similar to Fig. 2, but showing a completed valve cage.

Fig. 3 illustrates the manner in which a valve seat is formed in shoulder 18 to complete the manufacture of cage 11. The final step includes use of a swaging tool 23 having a flat annular gauge surface 24 formed at one end of a cylindrical shank 25 and having a hardened, frusto-conical tip 26 which extends axially beyond the gauge surface 24. A portion of the shank 25 fits snugly, but slidably, within the recess 20 so as to guide the tip 26 accurately into the throat 19. Tip 26 is formed with a smooth accurate frustro-conical surface to provide the desired size and taper of seat in throat 19 when the gauge surface 24 is forced flush against shoulder 18. In order to form the desired seat, tool 23 is inserted into the cage 11 until the tip 26 rests lightly against the inner edge of the shoulder 18. Thus, inserted, the tool is either struck a blow on its exposed end or subjected to pressure sufficient to seat the gauge surface 24 against the shoulder 18. Typically, the movement of the tool 23 will be only about one-sixty-fourth to one-thirty-second of an inch, and an accurately tapered seat will be formed in the cage. Fig. 4 shows the completed cage with a seat 28 formed therein in accordance with the above described process.

Figure 5:
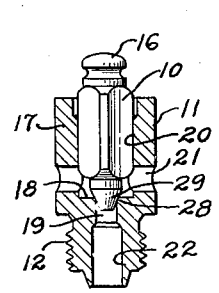
Fig. 5 is a view in vertical section showing a complete needle and seat combination.

As illustrated in Fig. 5, the seat 28 formed in cage 11 is adapted to receive the tapered extremity 29 of needle valve 10. While this tapered portion 29 is tool formed to the same taper as seat 28, and might therefore be expected to effect a liquid tight closure of the latter, it has been found that a tooled surface is generally insufficiently smooth and round to eliminate liquid leakage between these parts. The reason for this is shown in the exaggerated illustration of Fig. 6, wherein it will be noted that the surface of tapered valve portion 29, while conforming generally to the taper of seat 28, is irregularly ridged due to the manner in which it was formed. These ridges or tool marks, being of different height, do not afford a sealing contact with the smooth seat 28.

It is recognized, of course, that a surface to equal the smoothness of seat 28 may be provided on the tapered portion 29 through application of fine machining methods, such as lapping or the like, but such methods, besides being relatively expensive, impose added problems of inspection and control due to inherent difficulties in producing high accuracy in taper and roundness. It is, of course, obvious that, unless the needle face matches precisely with the tapered seat, the sealing action will be unsatisfactory.

Figure 6:
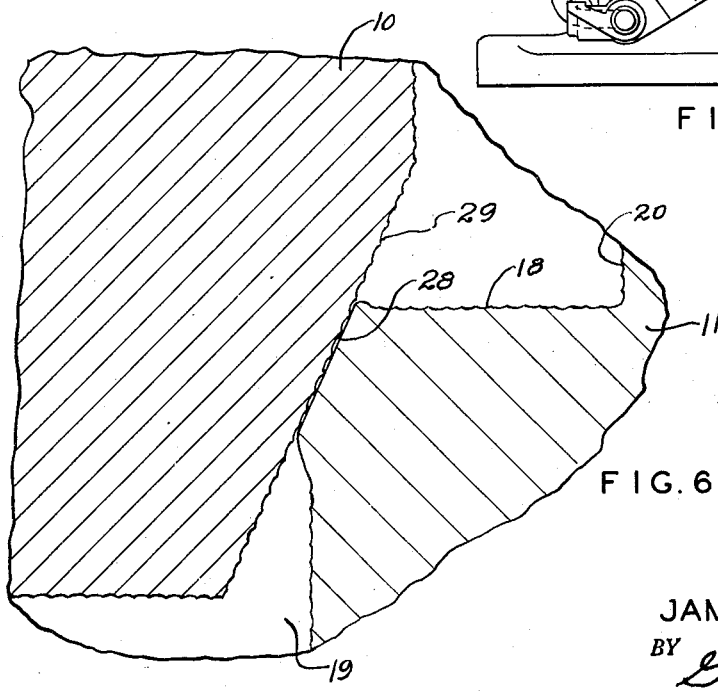
Fig. 6 is an exaggerated fragmentary section showing a tooled needle surface in engagement with a swaged seat.

In order to overcome the defective matching of surfaces illustrated in Fig. 6, the present invention contemplates plating or otherwise coating the tapered portion 29 of the needle 10, as with a soft metal. The coating may be lead, solder, tin, or the like, which is soft in comparison with the base metal of needle 10. Tin has been found to be particularly suitable.

Figure 7:
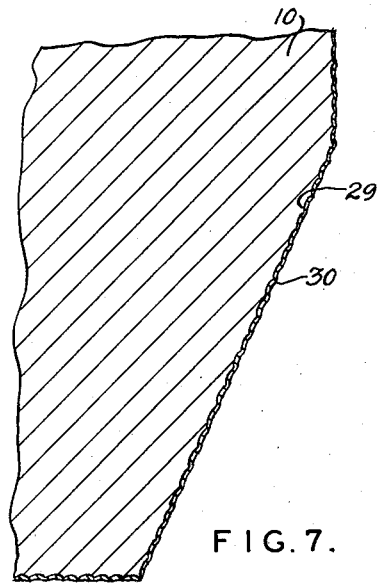
Fig. 7 is an exaggerated fragmentary section showing a tooled and coated needle valve surface.

As illustrated in Fig. 7, a needle 10 provided with a coating 30 of soft metal, such as tin, has a surface that is smoother than the original machined surface to which the coating is applied. In other words, it appears that, while the coating process fills up both the high and low points in the original surface, there is a tendency, possibly related to the phenomenon of surface tension, for the low points to accumulate a thicker coating than the high points. Still, however, the surface of the coating 30 is not reliably smooth and accurate enough to make an effective seal with the seat 28.

Figure 8:
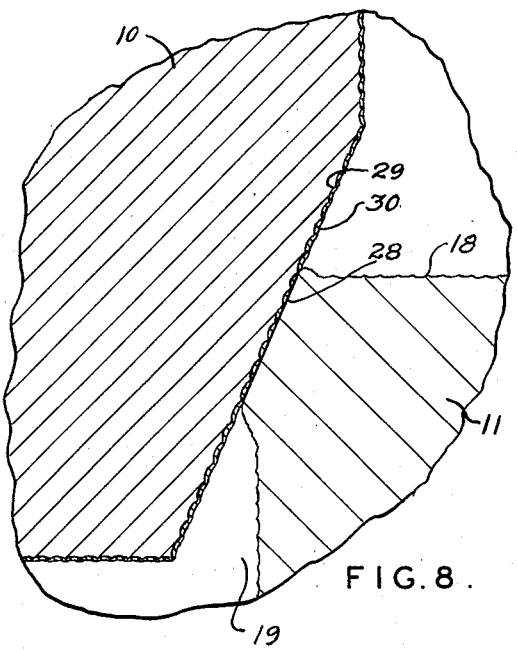
Fig. 8 is an exaggerated fragmentary section showing a tooled and coated needle valve surface snugly fitting a swaged seat as after lightly tapping the valve against its seat.
Figure 9:
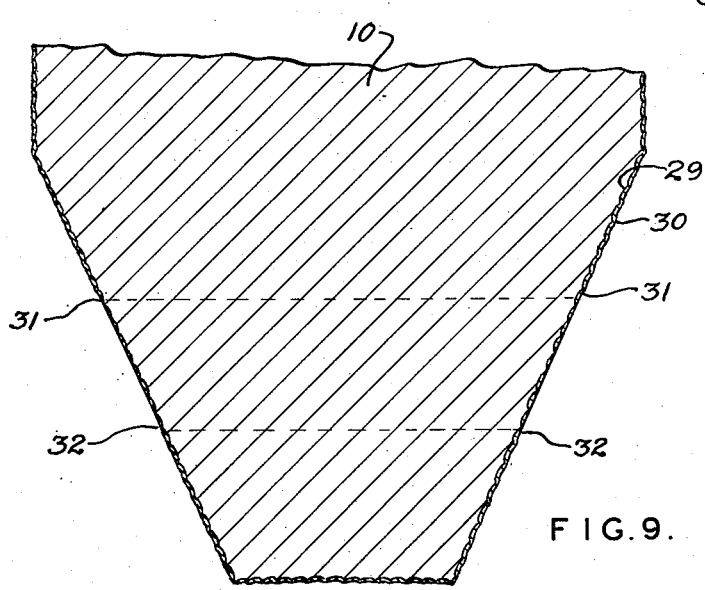
Fig. 9 is an exaggerated fragmentary section showing the effect upon a tooled and plated needle surface of the tapped engagement of Fig. 8.

The final step in maching the mating parts of the needle valve assembly is illustrated in Fig. 8. Here, tapered portion 29 of needle valve 10, having been provided with a coating 30, is inserted into the seat 28 and either rotated slightly under light pressure or given a light tap. This action compresses and extrudes the affected portion of the coating 30 to conform the same accurately to the seat 28, the level of the conformed surface being substantially along the peaks of the ridges in the underlying tooled surface. The conformed surface thus produced circumvents tapered portion 29, and, as indicated in Fig. 9, provides a bearing ring 31—32 which, perforce, matches valve seat 28.

The initial fit thus achieved between the valve and seat is not impaired through service operation of the parts, even though valve coating 30 may in time be worn away. On the contrary, it has been discovered that wearing of the coating 30 is accompanied by wearing of the original tool marks on the tapered portion 29, so that eventually a lapped fit obtains between the portion 29 and the seat 28.

In order to facilitate and to increase the accuracy of the lapping action above mentioned and prevent canting of the needle valve, it is desirable that operational forces tending to enforce abutment between tapered valve portion 29 and seat 28 be accurately applied axially of needle 10. With this in mind, attention is once more directed to the convex head 16 of the needle 10 and the concave depression 9 in the lug 8 of the float 4, and more particularly now to the disparate degrees of curvature in these elements. Clearly, the broad curvature of the depression 9 is adapted to center the convex head 16 of the valve 10 so that the forces therebetween are applied substantially axially of the valve.

Figure 10:
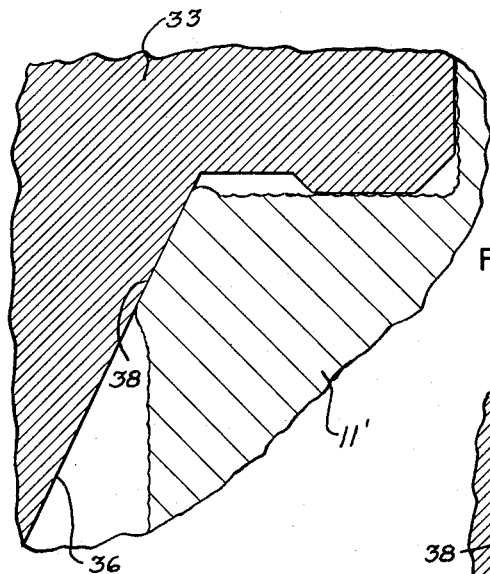
Fig. 10 is an exaggerated fragmentary section showing a completed initial swaging operation in the formation of a modified double swaged seat.
Figure 11:
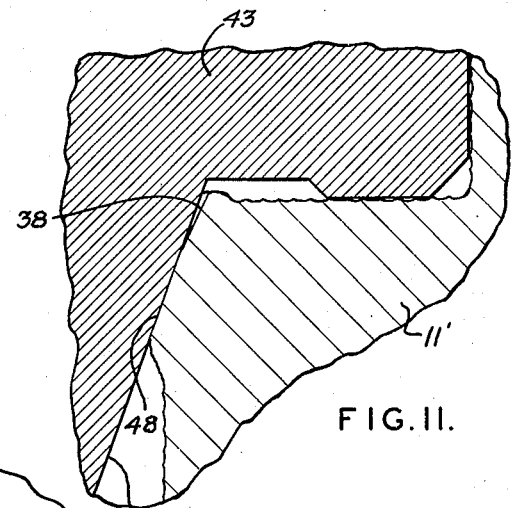
Fig. 11 is an exaggerated fragmentary section showing a completed final swaging operation in the formation of a double swaged seat.
Figure 12:
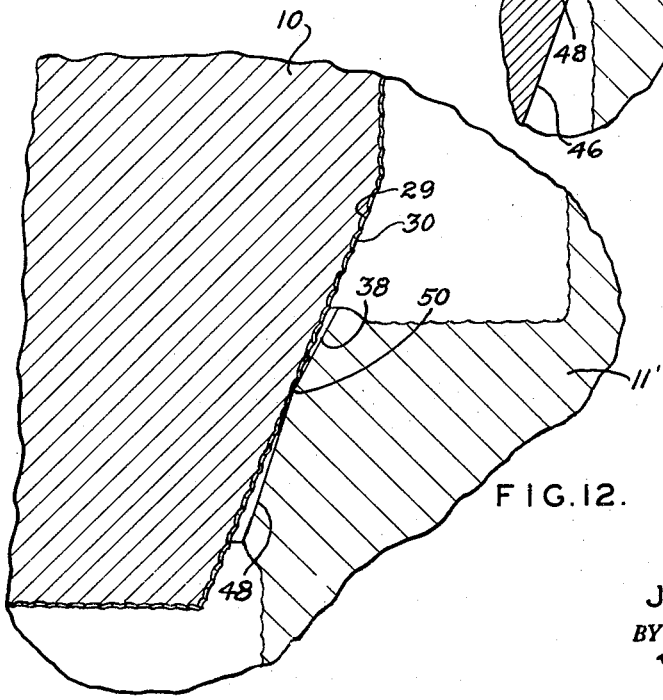
Fig. 12 is an exaggerated fragmentary section showing a tooled and coated needle surface in engagement with a double swaged seat.

In contrast with valve cage 11 of Figs. 1–5 provided with a frusto-conical valve seat 28, Figs. 10–12 illustrate a process for forming a seat having a double taper. This process includes providing a valve cage 11' which may be identical with the cage 11 as depicted in Fig. 2. The cage 11' is then swaged, not once, but twice, in the same manner as above described in respect to the cage 11. The two swaging operations are performed with different tools which, except for the dimensions of the hardened frusto-conical tips, may be identical with the previously described tool 23. Thus, Fig. 10 shows the first swaging operation to be performed with a tool 33, identical with the tool 23 except for the dimensions of the tip 36 which corresponds with tip 26 of tool 23. Whereas, as clearly shown in Figs. 6 and 8, the included angle of tool tip 26 is such as to provide a seat 28 which matches the taper of tapered portion 29 of needle valve 10, the included angle of tip 36 (Fig. 10) is substantially greater than that of valve portion 29. The swaging of the cage 11' with the tool 33 therefore provides a smooth frusto-conical surface 38 which is similar except for taper to valve seat 28 of cage 11 in the first form.

The second swaging operation for the cage 11' is performed, as shown in Fig. 11, with a tool 43, also identical with the tool 23, except for the taper of tip 46 which differs from tip 26 of Fig. 3, in having an included angle which is substantially less than that of valve tip 29. Hence, as shown in Fig. 11, tool tip 46 deforms a portion of the surface 38 previously formed to provide an adjoining, smooth, frusto-conical surface 48 with a taper less than that of tapered portion 29 of needle valve 10 eventually to be matched with cage 11'.

While the exact differences between the taper of the valve tip portion 29 and that of surfaces 38 and 48 is by no means critical, it may be mentioned that satisfactory results have been obtained employing differences of the order of two to four degrees.

As is evident from Fig. 12, the intersecting frusto-conical surfaces 38 and 48 define an annular "high point" 50 which is adapted, initially, for substantially line engagement with tapered portion 29 of the needle valve. The provision of the soft metal coating 30 followed by slight twisting or tapping of coated portion 29 against the ring 50 effects a liquid tight seal between these parts.

Clearly there has been described a novel method of producing accurately matched needle and seat combinations in conformance with the stated objective of the present invention.

It is to be understood that the foregoing description and the accompanying drawings have been given by way of illustration and example. It is also to be understood that changes in form of the elements and rearrangement of parts or process steps, which will be obvious to those skilled in the art, are contemplated as within the scope of the present invention which is limited only by the claims which follow.

What is claimed is:

1. A process for producing a needle for a needle valve assembly comprising forming a valve face to desired contour by machining operations, coating the contoured surface of the valve face with a soft metal, emplacing the coated surface in a previously formed seat, and conforming the coated surface with the seat by forcing the valve onto the seat to deform the soft metal sufficiently to form a temporary seal between said valve face and its seat of a thickness such that a portion of the valve face is worn away by a lapping action during initial operation of the valve to provide a lapped seating surface formed partially of the valve metal and partially of the metal coating.

2. A process for producing a needle for a needle valve assembly comprising forming a valve face to desired contour by machining operations, coating the contoured surface of the valve face with a soft metal, emplacing the coated surface in a previously formed seat having line contact defined by converging faces, and conforming the coated surface with the seat by forcing the valve onto the seat to deform the soft metal sufficiently to form a temporary seal between said valve face and its seat of a thickness such that a portion of the valve face is worn away by a lapping action during initial operation of the valve to provide a lapped seating surface formed partially of the valve metal and partially of the metal coating.

References Cited in the file of this patent

UNITED STATES PATENTS

| | | |
|---|---|---|
| 341,652 | Goeggel | May 11, 1886 |
| 413,216 | Weber | Oct. 2, 1889 |
| 668,012 | Locke | Feb. 12, 1901 |
| 927,753 | Ricksecker | July 13, 1909 |
| 1,021,681 | Jennings | Mar. 26, 1912 |
| 1,390,022 | Coakley | Sept. 6, 1921 |
| 1,566,645 | Breeze | Dec. 22, 1925 |
| 1,589,243 | Scott | June 15, 1926 |
| 2,066,523 | Ewart | Jan. 5, 1937 |
| 2,214,271 | Camerota | Sept. 10, 1940 |
| 2,621,524 | Bretschneider | Dec. 16, 1952 |

FOREIGN PATENTS

| | | |
|---|---|---|
| 459,662 | Great Britain | 1937 |